Feb. 23, 1932.　　　F. ROSENTHAL　　　1,846,613
MANICURE DEVICE
Filed Feb. 3, 1931
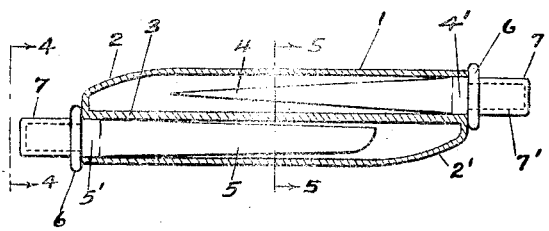
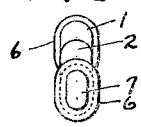 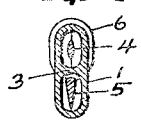
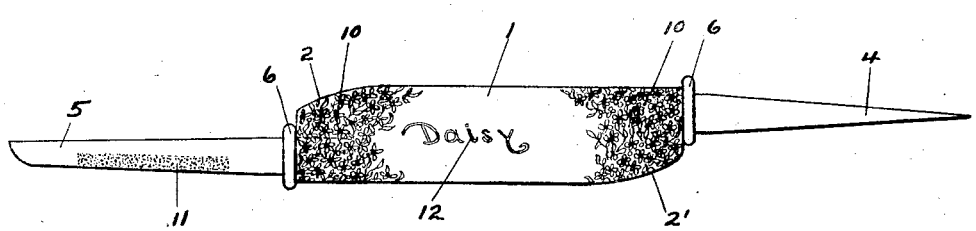
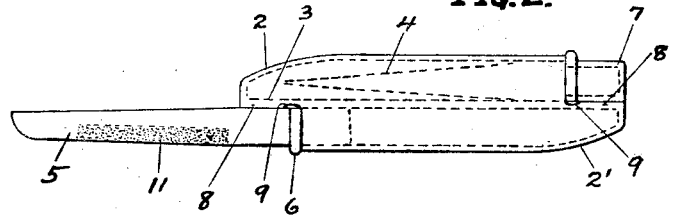
INVENTOR.
FRANK ROSENTHAL
BY
ATTORNEYS.

Patented Feb. 23, 1932

1,846,613

UNITED STATES PATENT OFFICE

FRANK ROSENTHAL, OF SAN FRANCISCO, CALIFORNIA

MANICURE DEVICE

Application filed February 3, 1931. Serial No. 513,128.

This invention relates to manicure devices and has for its objects improvements in such devices whereby a plurality of implements may be had, and kept free from contamination. Other features of the device will appear in the following description and accompanying drawings.

In the drawings Fig. 1 is a plan view of my manicure device with two implements in position of use.

Fig. 2 is a plan view of a modified form of holder showing one implement only extended and the other encased.

Fig. 3 is a vertical cross section of the device of Fig. 1 with both tools within the holder.

Fig. 4 is an end view of Fig. 3 as seen from the line 4—4 thereof.

Fig. 5 is a cross section of Fig. 3 taken along the line 5—5 thereof.

In further detail the device consists of a hollow handle 1 preferably made of bakelite or similar material, though thin metal will also serve the purpose. This handle is of elongated form with diagonal corners rounded or slanted off as at 2, 2' and longitudinally dividing the hollow interior into two chambers is a wall 3.

The two chambers in the handle are of oval form in cross section and open at the ends respectively remote from the rounded closed ends 2, 2', while fitting within the chambers and projecting from the open ends thereof are manicure implements 4, 5 preferably made of orange wood and variously pointed and shaped as is customary with such implements. These implements are provided with slightly tapering necks of ovaloid form 4', 5' tightly fitting within the ovaloid sockets formed by the open ends of the chambers, while at 6 on the shank of each implement is a stop flange and beyond which is an ovaloid extension 7 of a size to fit into the socket when the implement is reversed as in Fig. 1.

This extension 7 is preferably tapered ever so slightly so as to fit tightly within the socket, and preferably formed of bakelite or similar material, or of light metal fitted over a reduced oval end 7' of the wooden implement and cemented or otherwise securely attached thereto, though the entire implement including flange and extension 7 may be formed out of a single piece of orange wood.

On the flattened side of one or more of the wooden implements I preferably provide a patch of abrasive such as sand or emery as at 11, by cementing thereto. This is for finishing the edges of the finger nails.

When the implements are drawn out and reversed in the sockets they are held against revolving by the oval form of the sockets, and the flange 6 preferably just comes against the end of the handle so as to avoid wedging of the extension 7 too tight in the socket for removal, and when the implements are reversed and projected into the handle as in Fig. 3 the sockets align the implements within their respective chambers so that the points are held free from contact with the walls of the chambers.

In the construction shown in Fig. 2 the handle instead of terminating square on each end is stepped so that a portion 8 extends outwardly to the end of the extension 7 at each end. This portion 8 is also relieved a trifle at 9 and the flange 6 is also cut away at that point so that the extension 8 will bear against the implement when in extended position and thereby enable it to resist a much greater upward pressure in use in manicuring operations. This arrangement also makes a more compact looking device to go in a lady's purse and less liable to catch on things as it has no projecting ends.

The form of the handle with flattened sides and rounded corners adapts it for surface ornamentation as at 10 and the engraving of the owner's name at 12.

Having thus described my invention, I claim:—

1. A manicure device comprising an elongated hollow handle, tubular sockets at opposite ends of the handle disposed in offset relation, and implements arranged to fit in the sockets extending within the handle and to be reversed therein for extending therefrom.

2. A manicure device comprising an elongated hollow handle, tubular sockets at opposite ends of the handle disposed in offset relation, and implements arranged to fit in the sockets extending within the handle and to be reversed therein for extending therefrom, said implements when in the socket extending in overlying relation.

3. A manicure device comprising an elongated hollow handle, tubular sockets at opposite ends of the handle disposed in offset relation, implements arranged to fit in the sockets extending within the handle and to be reversed therein for extending therefrom, said implements when in the socket extending in overlying relation, and a wall within the handle separating the interior into two chambers, one for each implement.

4. A manicure device comprising an elongated hollow handle, tubular sockets at opposite ends of the handle disposed in offset relation, and implements arranged to fit in the sockets extending within the handle and to be reversed therein for extending therefrom, said sockets being of ovaloid form and the implements being provided with similarly formed shanks to fit therein.

5. A manicure device comprising an elongated hollow handle, tubular sockets at opposite ends of the handle disposed in offset relation, implements arranged to fit in the sockets extending within the handle and to be reversed therein for extending therefrom, and said implements each provided with a flange forming a stop against the handle when the implement is positioned in the socket.

6. A manicure device comprising an elongated hollow handle provided with a tubular socket at the end, a manicure implement formed with a shank adapted for reversing in said socket for extending the implement within the handle or projecting it therefrom, and said handle provided with a projection adapted to engage the implement at a point beyond the socket when the implement is in projected position.

7. A manicure device comprising an elongated hollow handle of generally flat form, manicure implements fitting within the handle and extendable therefrom respectively at opposite ends of the handle substantially in line with one edge of the handle, and the opposite corner adjacent each implement slanted to the end of the handle toward the implement.

FRANK ROSENTHAL.